United States Patent
Kaida et al.

(10) Patent No.: US 6,313,186 B1
(45) Date of Patent: Nov. 6, 2001

(54) INORGANIC-ORGANIC COMPOSITE FOAM AND PROCESS FOR THE PRODUCTION THEREOF

(75) Inventors: Shinzou Kaida; Tomokazu Shimizu, both of Kyoto; Misao Okamoto, Osaka, all of (JP)

(73) Assignees: Sanyo Chemical Industries, Ltd., Kyoto; Sekisui House, Ltd., Osaka, both of (JP)

( * ) Notice: Subject to any disclaimer, the term of this patent is extended or adjusted under 35 U.S.C. 154(b) by 0 days.

(21) Appl. No.: 09/011,931

(22) PCT Filed: Jun. 28, 1996

(86) PCT No.: PCT/JP96/01814
§ 371 Date: Feb. 17, 1998
§ 102(e) Date: Feb. 17, 1998

(87) PCT Pub. No.: WO97/11925
PCT Pub. Date: Apr. 3, 1997

(30) Foreign Application Priority Data

Sep. 27, 1995 (JP) ...................................... 7-274908
Mar. 27, 1996 (JP) ...................................... 8-99352

(51) Int. Cl.[7] .................................................. C08G 18/10
(52) U.S. Cl. ........................... 521/106; 521/108; 521/159; 521/172; 521/174; 528/72
(58) Field of Search ................................. 521/106, 174, 521/172, 108, 159; 528/72

(56) References Cited

U.S. PATENT DOCUMENTS

| | | | |
|---|---|---|---|
| 3,153,013 | * 10/1964 | Campbell | 528/67 |
| 3,245,922 | * 4/1966 | Worsley et al. | 528/72 |
| 3,383,351 | 5/1968 | Stamberger . | |
| 4,122,047 | * 10/1978 | Filip et al. | 521/106 |
| 4,361,692 | * 11/1982 | Ammons | 528/51 |
| 4,369,064 | 1/1983 | von Bonin . | |
| 4,871,477 | 10/1989 | Dimanshteyn . | |
| 5,110,840 | * 5/1992 | Blount | 521/85 |

FOREIGN PATENT DOCUMENTS

| | | |
|---|---|---|
| 0 853 073 A1 | 7/1998 | (EP) . |
| 919067 | 2/1963 | (GB) . |
| 2011926 A | 7/1979 | (GB) . |
| 50-86563 | 7/1975 | (JP) . |
| 50-86854 | 7/1975 | (JP) . |
| 50-87164 | 7/1975 | (JP) . |
| 50-115222 | 9/1975 | (JP) . |
| 51-109044 | 9/1976 | (JP) . |
| 56-55434 | 5/1981 | (JP) . |
| 56-36145 | 8/1981 | (JP) . |
| 62-253611 A | 11/1987 | (JP) . |
| 4-292683 | 10/1992 | (JP) . |
| 2-150433 | 6/1999 | (JP) . |

* cited by examiner

Primary Examiner—Morton Foelak
(74) Attorney, Agent, or Firm—Merchant & Gould P.C.

(57) ABSTRACT

A inorganic-organic composite foam having a structure comprising phosphoric acids and a blowing agent for phosphoric acids, wherein the brittleness is improved by urethane prepolymer having NCO groups. The foam is produced by foaming and curing by mixing each component of phosphoric acids, a blowing agent for phosphoric acids, urethane prepolymer having NCO groups, water, and, if necessary, an inorganic filler. A foam of phosphoric acids is inherently brittle, but the brittleness is improved, and flexibility and rebound resilience can be provided. The foam of the present invention is effectively used for the applications, for example, heat insulating materials of external panel or internal panel which require the fire preventive property of train, automobile, housing, building etc.; sound absorbent materials for floor or wall; fire preventive or fireproof materials; heat insulating materials for fireproof safe, freezer, refrigerator; fireproof covering materials; lightweight aggregate; gap filler; synthetic wood having fire preventive property and the like.

20 Claims, 2 Drawing Sheets

INORGANIC-ORGANIC COMPOSITE FOAM AND PROCESS FOR THE PRODUCTION THEREOF

TECHNICAL FIELD

The invention relates to an inorganic-organic composite foam and a process for the production thereof.

More specifically, it relates to an inorganic-organic composite foam having a structure of an inorganic foam whose brittleness is remarkably improved by an reactive elastic polymer, being not inferior to the foam having flexibility and rebound resilience such as urethane foam or styrene foam, and further having a fire preventive property; and to a process for the production of an inorganic-organic composite foam, capable of producing the foam even under conditions of room temperature and ordinary pressure.

BACKGROUND ART

Hitherto, a foam of phosphoric acids has been suggested as an inorganic foam that can be produced under room temperature and ordinary pressure (see, for example Japanese Patent Publication No. 56-36145).

The foam described in this published official gazette is obtained by stirring and mixing phosphoric acids such as metal phosphate and blowing agent such as multivalent metal carbonate etc., and subjecting the mixture to foaming and curing. Since this foam has the following characteristics, it is applicable for not only a fixed shape material such as a panel etc. but also not-fixed shape filler for filling an opening portion, and, therefore, this material can be regarded as the excellent material that has not previously existed.

(1) The obtained foam is excellent in non-combustibility and fire proof property.
(2) In the production of the foam, the control of specific gravity in a wide range can easily be conducted.
(3) This foamable composition has the self blowing property.

However, since the foam of phosphoric acids is a completely inorganic material, it has shortcomings. That is, it is brittle, and so just a little force can break foams and the broken foam cannot be recovered. Especially, when a big panel having low specific gravity is produced, there are following problems, for example, the surface is broken by only being touched; and further, the panel strength is too weak for the panel to be carried out. Consequently, such foam is far from a practical material.

As a means for improving such shortcomings of the foam of phosphoric acids, the method in which a resin emulsion such as SBR etc. is added to the composition is suggested (see, for example, JP-6-24869 A).

In this method, by adding resin emulsion to an extent that does not damage the excellent non-combustibility and heat resistance property that are the distinctive features of the foam of phosphoric acids, the strength of the foam is enhanced, and a practical material can be produced even from a foam having a high blowing ratio.

Although the strength of the foam of phosphoric acids can be improved drastically by adding resin emulsion, it is difficult to sufficiently improve the brittleness of the foam having a high blowing ratio, since this foam is an inherently brittle material. Moreover, it is further difficult to obtain a foam having a flexibility and rebound resilience like an urethane foam or a styrene foam.

The present inventors have intensively investigated in order to improve the above mentioned problems and obtained a foam using an urethane prepolymer having NCO groups that has reactivity and elastic property unlike the above mentioned resin emulsion.

Moreover, as a result of the investigation, the present inventors found that even if a foam having a high blowing ratio is produced by using this prepolymer, it exhibits the flexibility and rebound resilience as excellent as those of soft urethane foam although the obtained foam is inorganic-organic composite foam. This blowing ratio can be adjusted from soft to hard, and the brittleness can be improved remarkably in both the soft case and the hard case.

In other words, it is an object of the present invention to provide an inorganic-organic composite foam having non-combustibility and heat resistance, having a structure of an inorganic foam, with the brittleness remarkably improved by a reactive elastic polymer, and to provide a process for the production of the inorganic-organic composite foam, capable of producing the foam under conditions of room temperature and ordinary pressure.

DISCLOSURE OF INVENTION

In other words, the present invention relates to the following inorganic-organic composite foam <1> and <2>, and a process for the production of the inorganic-organic composite foam <3>.

<1> An inorganic-organic composite foam having a foam structure made from phosphoric acids (a) and a blowing agent for phosphoric acids (b) and improved in brittleness by an urethane prepolymer having NCO groups (c).

<2> The above mentioned foam further comprising an inorganic filler (d).

<3> A process for the production of an inorganic-organic composite foam by foaming and curing by mixing each component, of phosphoric acids (a), a blowing agent for phosphoric acids (b), urethane prepolymer having NCO groups (c), water and, if necessary, an inorganic filler (d).

BEST MODE FOR CARRYING OUT THE INVENTION

The inorganic-organic composite foam of the present invention has an inorganic structure in which phosphoric acids (a) and a blowing agent for phosphoric acids (b) are reacted to foam. The fact that this foam has an inorganic structure is confirmed by FIG. 4 that is an electron micrograph of the cross section of a foam of Example 1 of the present invention taken after it had been burnt.

Moreover, in the foam of the present invention, the brittleness is improved by the prepolymer (c). Since the prepolymer (c) is a reactive elastic polymer and has NCO groups having the reactivity with a compound containing active hydrogen such as water, the brittleness is improved due to the elastic polymer produced by a reaction and cure of the prepolymer (c) in the foam of the present invention.

Figure 3:
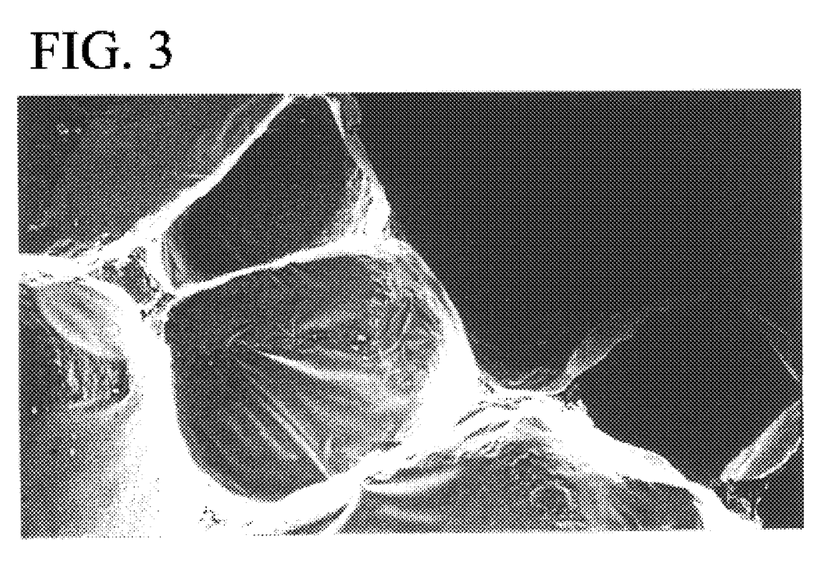
FIG. 3 is an electron micrograph of the foam of Example 1 of the present invention.

According to FIG. 3 that is an electron micorgraph of the foam of Example 1 of the present invention taken before it had been burnt, the coating film made from the prepolymer (c) is formed in the foam of the present invention. And it is thought that this coating film provides a foam with elasticity as well as functions to improve the brittleness.

The foam of the present invention is obtained in which an aqueous mixture is produced by mixing components, for example, phosphoric acids (a), the blowing agent (b) and the prepolymer (c), and subjecting the obtained aqueous mixture to foaming and curing. In other words, by preparing this aqueous mixture, the foaming and curing reaction of (a) and (b) and the curing reaction of (c) with water proceed, and thereby the foam of the present invention can be obtained.

In the present invention, as the phosphoric acid (a), for example, phosphoric acid, phosphorous acid, phosphoric acid anhydride, condensed phosphoric acid, a multivalent metal salt thereof and the mixtures of two or more of the above are mentioned. Among the above, as the multivalent metal salt of the phosphoric acid, primary phosphate of multivalent metal, secondary phosphate of multivalent metal, and tertiary phosphate of multivalent metal are mentioned.

Moreover, as the metal constituting the above mentioned polyvalent metal salt, magnesium, calcium, aluminum, zinc, barium, iron, etc. are mentioned. These multivalent metal components may be added in a form of phosphate of multivalent metal, and phosphate of multivalent metal. Besides the above, the polyvalent metal salt component may also be used in a way in which a metallic compound that is chemically active with phosphoric acid or phosphorous acid, for example, multivalent metal oxide such as magnesium oxide, calcium oxide or the like, or multivalent metal hydroxide such as aluminum hydroxide gel, magnesium hydroxide, and calcium hydroxide or the like, is added separately from phosphoric acids such as phosphoric acid, phosphorous acid or the like, as components for an aqueous mixture, to thus react the above components in the aqueous mixture.

The preferable examples of the phosphoric acids (a) are phosphoric acid, magnesium primary phosphate, aluminum primary phosphate, zinc primary phosphate and the mixture of two or more of the above. More preferable examples are phosphoric acid, magnesium primary phosphate, aluminum primary phosphate, and the mixture of two or more of the above. The phosphoric acids (a) have generally a pH of not more than 4, preferably of not more than 3, and more preferably of not more than 2 in terms of the reactivity with respect to the above mentioned blowing agent (b).

The content of the phosphoric acids (a) is generally in the range of 3 to 50 weight % with respect to the whole components constituting the foam of the present invention. Moreover, the preferable content, when converted to the content of phosphoric atom, is in the range of 3 to 20 weight %, and more preferably in the range of 4 to 18 weight %.

If the content of the phosphoric atom is less than 3 weight %, the fire preventive property of the obtained foam is deteriorated. If the content of the phosphoric atom is more than 20 weight %, the dispersion property of the prepolymer (c) is deteriorated and uniform foam structure occasionally cannot be obtained.

As the blowing agent (b) of the present invention, for example, the following (b1) and (b2) are mentioned:
(b1) carbonate compound; and
(b2) a light metal that generates gas by reacting with acid or alkali.

The specific examples of the carbonate compound (b1) include sodium carbonate, sodium hydrogen carbonate, potassium carbonate, ammonium carbonate, calcium carbonate, barium carbonate, basic magnesium carbonate, basic zinc carbonate and the like. The specific examples of the above mentioned light weight metal (b2) include magnesium, aluminum, zinc and the like.

The preferable example of the blowing agent (b) is basic magnesium carbonate.

The content of the blowing agent (b) may be determined depending upon the desired blowing ratio widely ranging from soft to hard. The amount of (b) is not limited as long as it is within the range in which (a) and (b) are well mixed when an aqueous mixture is made. However, the content of (b) is generally in the range of 0.1 to 200 parts by weight, and preferably in the range of 1 to 100 parts by weight with respect to 100 parts by weight of phosphoric acids (a).

In the present invention, as the prepolymer (c), a prepolymer derived from an organic polyisocyanate compound (n) and a compound containing active hydrogen (h) and having NCO groups in the molecule is mentioned.

As the polyisocyanate compound (n), for example, the following (n1) to (n5) are mentioned. However, the carbon number of (n1) to (n5) is the numerical value excluding the carbon number in the NCO group.

(n1) aliphatic polyisocyanate having the carbon number of 2 to 12;

(n2) alicyclic polyisocyanate having the carbon number of 4 to 15;

(n3) araliphatic aliphatic polyisocyanate having the carbon number of 8 to 12;

(n4) aromatic polyisocyanate having the carbon number of 6 to 20; and (n5) modified polyisocyanates of the above (n1) to (n4).

The specific examples of the aliphatic polyisocyanate (n1) include:

ethylene diisocyanate, tetramethylene diisocyanate, hexamethylene diisocyanate (HDI), dodecamethylene diisocyanate 2, 2, 4-trimethyl hexamethylene diisocyanate, lysine diisocyanate, and 1, 3, 6-hexamethylene diisocyanate.

The specific examples of the alicyclic polyisocyanate (n2) include:

isophorone diisocyanate (IPDI), dicyclo hexyl methane-4, 4'-diisocyanate (hydrogenated MDI), 1, 4-cyclohexane diisocyanate, methylcyclohexane-2, 4-diisocyanate (hydrogenated TDI), 1, 4-bis (2 isocyanate ethyl) cyclohexane, and the like.

The specific examples of the araliphatic polyisocyanate (n3) include:

p-xylylene diisocyanate, tetramethyl xylene diisocyanate, and the like.

The specific examples of the aromatic polyisocyanate (n4) include:

1, 4-phenylene diisocyanate, 2, 4- or 2, 6-toluene diisocyanate (TDI), diphenylmethane-2, 4'- or 4, 4'-diisocyanate (MDI), naphthalene-1, 5-diisocyanate, 3, 3'-dimethyldiphenylmethane-4, 4'-diisocyanate, crude TDI, polyphenyl methane polyisocyanate [common name is crude MDI: a phosgene compound of a condensation product comprising aromatic amine such as aniline or the mixture thereof and formaldehyde (the mixture of diamino diphenylmethane and small amount of, for example, 1 to 20 wt. % of polyamine having not less than three amino groups)], and the like.

The specific examples of the modified material (n5) of polyisocyanates of the above (n1) to (n4) include a modified material in which carbon amide group, uretdion group, uretone-imine group, urea group, biuret group, isocyanurate group, urethane group and the like are introduced instead of the above mentioned isocyanate group of polyisocyanate mentioned as (n1) to (n4).

The selection of these organic polyisocyanate compounds (n) is not particularly limited, and the organic polyisocyanate compounds (n) can be used as a component for deriving the urethane prepolymer singly or in optional combinations thereof in accordance with the quality of the foam or the cost.

As the compounds containing active hydrogen (h), for example, a low molecular weight polyol (h1) and a high molecular weight polyol (h2) are mentioned.

Herein, the ranges of each molecular weight of (h1) and (h2) are respectively expressed by the value of the hydroxyl group; the value of the hydroxyl group of (h1) is generally in the range of 300 to 1000 or more, preferably in the range of 350 to 800; on the other hand, the value of the hydroxyl group of (h2) is generally less than 300, preferably in the range of 20 to 250, more preferably in the range of 50 to 200.

Moreover, the number of functional groups of the compounds containing active hydrogen (h) is generally in the range of 2 to 8 or more in both cases of (h1) and (h2).

As the low molecular weight polyol (h1), the following (h1-1) to (h1-6) are mentioned:

(h1-1) aliphatic dihydric alcohols, (h1-2) low molecular weight diols having cyclic groups, (h1-3) trihydric alcohols, (h1-4) polyhydric alcohols having not less than four functional groups, (h1-5) alkanolamines, (h1-6) low molar adducts of ethylene oxide and/or propylene oxide of the compounds of (h1-1) to (h1-5).

On the other hand, as the low molecular weight polyol (h2), the following (h2-1) to (h2-6) are mentioned:

(h2-1) polyoxy alkylene polyol, (h2-2) polyester polyol, (h2-3) polyolefin polyol, (h2-4) acrylic polyol, (h2-5) castor oil based polyol, and (h2-6) polymer polyol.

The specific examples of the aliphatic dihydric alcohols (h1-1) among the low molecular weight polyols (h1) include: ethylene glycol, dietylene glycol, propylene glycol, dipropylene glycol, 1, 4- butanediol, neopentylglycol, 1,6 hexanediol, 1, 8 octamethylene diol, and the like.

The specific examples of the low molecular weight diols having cyclic groups (h1-2) include 1, 4 bis (2 hydroxyethoxy phenyl) propane and the like.

The specific examples of the trihydric alcohols (h1-3) include glycerin, trimethylolpropane, hexanetriol, and the like.

The specific examples of the polyhydric alcohols having not less than four functional groups (h1-4) include sorbitol, sucrose, and the like.

The specific examples of the alkanolamines (h1-5) include triethanolamine, methyldiethanolamine, and the like.

The specific examples of the above mentioned low molar adduct (h1-6) include adducts in which ethylene oxide and/or propylene oxide are added into the compound of the specific examples (h1-1) to (h1-5) in a low molar amount within the range in which the value of the hydroxyl group is not less than 300.

On the other hand, among the high molecular weight polyol (h2), as the polyoxy alkylene polyol (h2-1), the adduct in which alkylene oxide is added to the compounds of (h1-1) to (h1-5) explained in the item of the low molecular weight polyol (h1), low molecular weight amines, polyhydric phenols, etc. are mentioned.

As the low molecular weight amines, low molar polyamine such as ethylenediamine, tetramethylene diamine, hexamethylene diamine; low molar monoamine such as n-butyl amine, stearylamine etc. are mentioned. As the polyhydric phenols, hydroquinon, bisphenol A, bisphenol F, bisphenol S etc. are mentioned.

As alkylene oxide to be added, alkylene oxide having the carbon numbers of 2 to 4, for example, ethylene oxide, propylene oxide, butylene oxide and the combination thereof are mentioned. (In the case of the combination, both a block addition and a random addition may applied.)

The specific examples of the polyoxy alkylene polyol (h2-1) include polyoxy propylene glycol, polyoxy propylene triol, polyoxy ethylene polyoxy propylene glycol, polyoxy ethylene polyoxy propylene triol, polyoxy propylene tetraol, polyoxy tetramethylene glycol, and the like.

As polyester polyol (h2-2), for example, the following (h2-21) to (h2-23) are mentioned:

(h2-21) condesation polyester polyol obtained by reacting polyhydric alcohols having not less than two functional groups and dicarboxylic acids.

(h2-22) polylactone polyol obtained by a ring-opening polymerization of lactone; and (h2-23) polycarbonate polyol obtained by a reaction of ethylene carbonate and 1, 6 hexane diol.

As the dicarboxylic acids constituting the condensation polyester polyol (h2-21), for example:

aliphatic dicarboxylic acids (succinic acid, adipic acid, sebacic acid, glutaric acid, azelaic acid, maleic acid, fumaric acid etc.);

aromatic dicarboxylic acids (terephthalic acid, isophthalic acid etc.);

anhydride of these dicarboxylic acids, lower alkyl (the carbon number of 1 to 4) ester or acid halide (acid chloride etc.);

and the mixture of two or more of the above are mentioned.

As the lactone used for a raw material component of polylactone polyol (h2-22), for example, ε-caprolactone is mentioned.

The specific examples of the polyester polyol (h2-2) include: polyethylene adipate, polybuthylene adipate, polyhexamethylene adipate, polyneopentyl adipate, polyethylene polypropylene adipate, polyethyene buthylene adipate, polybuthylene hexamethylene adipate, polydiethylene adipate, poly(polytetramethylene ether) adipate, polyethylene azelate, polyehtylene sebacate, polybutylene azelate, polybutylene sebacate, polyethylene terephthalate, polycaprolactone diol, polycarbonate diol, and the like.

The specific examples of the polyolefin polyol (h2-3) include polybutadiene polyol, hydrogenated polybutadiene polyol, polyisoprene polyol, and the like.

The specific examples of the acrylic polyol (h2-4) include: a copolymer of hydroxyethyl acrylate and ethylacrylate, a copolymer of hydroxyethyl acrylate, ethylacrylate and styrene, and the like.

As the castor oil based polyol (h2-5), (h2-51) castor oil, (h2-52) polyester polyol of castor oil fatty acids and polyhydric alcohol or polyoxy alkylene polyol, and the mixture of two or more of them are examples.

The specific examples of (h2-52) include mono-, di- or triester of castor oil fatty acid and trimethylol propane; mono- or diester of castor oil fatty acid and polyoxypropylene glycol, and the like.

As the polymer polyol (h2-6), the polymer obtained by polymerizing an ethylenically unsaturated monomer described in the description of U.S. Pat. No. 3,383,351, for example, acrylonitrile, styrene etc. in the high molecular weight polyol mentioned as (h2-1) to (h2-5). The content of the ethylenically unsaturated monomer unit constituting the polymer polyol (h2-6) is generally in the range of 0.1 to 90 wt. %, preferably in the range of 5.0 to 80 wt. %.

As the process for the production of the polymer polyol (h2-6), for example, the process in which ethylenycally unsaturated monomer is polymerized in the polyols in the presence of the polymerizing initiator (radical generating agent etc.) are mentioned. (See, for example, the process described in the description of U.S. Pat. No. 3,383,351.)

The most preferable example of the above mentioned compound containing active hydrogen (h) is an ethylene oxide adduct of the polyoxy alkylene polyol (h2-1). It is preferable that the ethylene oxide adduct is used singly or as a part of the compound containing active hydrogen (h).

In this case, the content of oxyethylene unit in the compound containing active hydrogen (h) is in the range of 10 to 95 wt. %; more preferably in the range of 50 to 90 wt. %. By using ethylene oxide adduct, the dispersion property of the prepolymer (c) is improved at the time of producing an aqueous mixture.

The low molecular weight polyol (h1) and high molecular weight polyol (h2) may be used singly or in combination with each other. The ratio of the low molecular weight polyol (h1) to high molecular weight polyol (h2) is not particularly limited. For example, in order to enhance the effect of improving the brittleness of the foam or to increase the effect of providing the flexibility, (h2) is preferably increased while satisfying the weight ratio of (h1):(h2)=(0–50):(50–100). On the other hand, in order to increase the rigidity of the foam, (h1) is preferably increased while satisfying the weight ratio of (h1):(h2)=(50–100):(0–50).

Moreover, in order to adjust the molecular weight and the viscosity of the prepolymer (c), if necessary, monool (h3) may be used as the (h) component. As the monool (h3), the following examples are mentioned:

Aliphatic monohydric alcohols such as methyl alcohol, ethyl alcohol, isopropanol, butanol, pentanol, 2-ethylhexanol, dodecanol, etc.

Alykylene oxide (ethylene oxide, propylene oxide etc.) adducts of alkyl phenol (octyl phenol, nonyl phenol, dodecyl phenol etc.). The molecular weight of the monool (h3) is generally in the same range as (h1) or (h2). The content of monool (h3) that is optionally used in the active hydrogen compound (h) is in the range to provide an average number of functional groups of generally not less than 2, and preferably not less than 2.5.

The content of NCOs in the prepolymer (c) is preferably in the range of 0.5 to 30 wt. %. Moreover, the properties of urethane prepolymer (c) are not particularly limited, but it is preferably in a liquid state at room temperature and has some degree of molecular weight and a molecular composition. The preferable molecular weight of (c) is in the range of 1000 to 50000.

As an example of the production process of the prepolymer (c), for example, the process in which organic polyisocyanate (n) and a compound containing active hydrogen (h) are prepared in the reaction vessel and reacted at 50 to 120° C. is mentioned.

The content of urethane polymer (c) unit in the foam of the present invention, that is, the content of (c) with respect to the entire solid parts at the time of producing the foam, is in the range of 5 to 30 wt. %, more preferably in the range of 10 to 25 wt. %. If the content is less than 5 %, the effect of improving the brittleness of the foam is deteriorated. If the content is more than 30%, the fire preventive property is deteriorated.

If necessary, inorganic filler (d) may be added to the foam of the present invention in consideration of the physical property and cost. As the inorganic filler (d), for example, the following (d1) to (d5) are mentioned.

(d1) cement: portland cement, silica cement, alumina cement, blastfurnace cement, fly ash cement, white cement etc.

(d2) clay mineral: morillonite, bentonite, mica, sericite, kaoline, talc fillite, zeolite etc.

(d3) inorganic light weight aggregate: pearlite, silas balloon etc.

(d4) inorganic fiber: carbon fiber, asbestos, rock wool, glass fiber, ceramic fiber, potassium titanate fiber, steel fiber etc.

(d5) other water insoluble inorganic powder materials: fly ash, silica fume, silicastone powder, ceramic powder, aluminum hydroxide, alumina, calcium carbonate, calcium sulfate etc.

The selection of the above mentioned (d) is not particularly limited. They may be added alone or in optional combinations in accordance with the requirement of the physical property of the foam or the cost etc.

For example, the addition of the cement (d1) improves the hardness of the foam. Among the cement (d1), alumina cement is preferred, because it is low alkaline among the cements, so that the reactivity to the phosphoric acids (a) is low.

The addition of the inorganic fiber (d4) improves the tensile strength, the bending strength, or the shape keeping property even if organics of the foam burn. Moreover, the addition of the aluminum hydroxide or calcium carbonate among (d5) improves the fire preventive property. Besides, the examples of (d) can be used as an extending agent mainly for the purpose of reducing the cost.

The addition content of (d) is not particularly limited. It is generally not more than 1800 parts by weight, preferably not more than 500 parts by weight with respect to 100 parts by weight of phosphoric acids (a). Moreover, as to the lower limit of the addition content is not limited as (d) is not always necessarily added. In a case where (d) is added, there is no concern no matter how small the addition content is. In a case where (d) is used as a filler for the purpose of reducing the cost, the content is preferably not less than 50 parts by weight.

Organic fibers can be used instead of or in combination with the above mentioned inorganic fiber (d4). Organic fiber also has the property for improving the tensile strength and bending strength of the foam. As the organic fiber, vinylon fiber, polyamide fiber, acrylic fiber, polyester fiber, polypropylene fiber, cellulose fiber and the like are mentioned. However, the content of organic fibers to be used needs to be in the range satisfying the requirement level of the fire preventive property of the foam.

If the content of (c) is in the above mentioned preferable range, the foam of the present invention has a quite high fire preventive property. However, in order to provide the much higher fire preventive property, foaming and curing can be conducted with adding flame retardant to the foam component.

As the flame retardant, non-halogen phosphate ester (triphenyl phosphate, cresyl diphenyl phosphate, ammonium polyphosphate etc.), phosphate ester containing halogen (tris chloroethyl phosphate, tris dichloropropyl phosophate, tris tiribromophenyl phosphate, tris dibromopropyl phosphate; flame retardant containing active hydrogen (di (isopropyl) N, N bis (2 hydroxyethyl) aminomethyl phosphate, alkylene oxide adduct of brominated bisphenol A etc.); anitmony trioxide, antimony pentoxide, zinc oxide, etc. are mentioned. The above mentioned examples may be used in combinations of one or two of the above.

The content to be used of the flame retardant is generally not more than 40 parts by weight, preferably in the range of 0.1 to 30 parts by weight with respect to 100 parts by weight of urethane prepolymer.

The foam of the present invention can be obtained by foaming and curing the aqueous mixture produced by mixing phosphoric acids (a), the blowing agent (b), the prepolymer (c), water, and, if necessary, inorganic filler (d) by the process for the production of the present invention.

If the content of water in this aqueous mixture is in the range that is capable of producing water slurry by mixing, water need not be added in more than the required amount. The more the water is included, the more time and labor it takes for drying the cured foam. The content of water is not particularly limited, but it is generally in the range that makes the concentration of the aqueous mixture to be in the range of 50 to 90 wt. %.

In the method of the present invention, in order to control the curing speed of the prepolymer (c), for example, catalyst may be added. As the catalysts, the following examples are mentioned:

metal type catalyst, for example, dibutyltin dilaurate, alkyl titanate, organic silica titanate, tin cotoate, lead octylate, zinc octylate, bismuth octylate, dibutyl tin diorthophenyl phenoxite, the reactive product of tin oxide and ester compound (dioctyl phthalate etc.) or the like;

amine type catalyst, for example, monoamines (triethyl amine etc.), diamines (N, N, N', N'-tetramethyl ethylene diamine etc.), triamines (N, N, N', N", N"-pentamethyl diethylene triamine etc.), cyclic amines (triethylene diamine etc.) and the like.

When the catalysts are used, metal type and amine type catalyst may be used alone or in combination with the both. The using ratio of the catalyst is generally not more than 10 parts by weight, preferably in the range of 0.001 to 5 parts by weight with respect to 100 parts by weight of prepolymer (c).

In the process of the present invention, in order to control the cell structure of the foam, a foam stabilizer may be added.

As the foam stabilizer, the conventionally known silicone surface active agent is mentioned, for example:

"SH-192", "SH-193", and "SH-194", the products of TORAY DOW CORNING SILICONE CO., Ltd., etc.

"TFA-4200", the product of TOSHIBA SILICONE CO., LTD., etc.

"L-5320", "L-5340" and "L-5350", the products of NIPPON UNICAR COMPANY LTD., etc.

"F-121" and "F-122", the products of Shin-Etsu Silicon CO., Ltd., etc. The content of the foam stabilizer is generally not more than 3 parts by weight, preferably in the range of 0.001 to 1 parts by weight with respect to 100 parts by weight of urethane prepolymer.

In the process for foaming and curing by mixing each component in the process of the present invention, there are the wide variety of methods as the below mentioned [1] to [4].

[1] The method in which phosphoric acids (a), the blowing agent (b), the prepolymer (c), water and, if necessary, the inorganic filler (d) are added at one time and mixed to thus foam and cure the product.

[2] The method in which phosphoric acids (a), the prepolymer (c) and water are mixed, then the blowing agent (b) and, if necessary, the inorganic filler (d) are added and mixed, to thus foam and cure the product.

[3] The method in which phosphoric acids (a) and the prepolymer (c) are mixed, and then the slurry mixture in which the blowing agent (b), water and, if necessary, inorganic filler (d) are preliminarily mixed is added and mixed, to thus foam and cure the product.

[4] The method in which phosphoric acids (a), the prepolymer (c) and a part of water are mixed, and then the slurry mixture in which the blowing agent (b), if necessary, inorganic filler (d) and the rest of water are mixed is added and mixed, to thus foam and cure the product.

Among the above, the preferable methods are [1], [2], and [4]. The most preferable method is [4].

The foam of the present invention can be obtained by mixing each component and then maintaining the obtained mixture in accordance with the above mentioned method under the conditions of room temperature and ordinary pressure. The mixed solution (slurry) foams in several minutes to several tens of minutes after standing still. Then, the curing is completed and thereby the foam is produced. However, in winter, or in a case where the air temperature is low, or in a case where the foaming and curing time is desired to be shortened in the process, the aqueous mixture may be heated to approximately 50° C. during still standing.

By the process of the present invention, the following foam can be produced:

① the foam of the present invention that is molded by poring the mixture into the mold; and ② the foam of the present invention that is applied onto an optional substrate such as wall etc., or filled into optional gaps. In a case of the molded product, the foam may be made by the above mentioned methods, by the use of a mold having an optional shape etc. (for example, a mold of a large panel). In the case of applying, the mixture obtained by the above mentioned method may be formed into the foam by way of spraying or troweling etc.

The specific gravity of the foam of the present invention can be adjusted in a wide range by increasing or decreasing the amount of the blowing agent (b). Moreover, the obtained foam is not brittle on its surface even at a low specific gravity of not more than 0.1. By adjusting the composition and blending ratio, a wide variety of properties of foams, that is, from soft foam to hard foam, can be obtained.

Moreover, as to the heat insulating property of the foam, by controlling the specific gravity, a low thermal conductivity of, for example, not more than 0.03 kcal/m·hr·° C., can be provided, as well as the fire preventive property also corresponding to the level of non-combustible to semi-non-combustible material. The material of the foam of the present invention is regarded as a material having an excellent property as compared with the conventional heat insulating material such as glass wool, hard urethane foam etc.

Therefore, the foam of the present invention can be used as an insulating material for large outer wall panel or inter wall panel, sound insulating material, fire preventive and fireproof material, fireproof covering material, light weight aggregate, heat insulating material for fireproof safe or the like.

In more detail, by utilizing the fire preventive property, heat insulation property, elasticity, flexibility, strength, and low density etc., the foam of the present invention is preferably used for, for example, the following applications.

① The application requiring the fire preventive property, for example, train, automobile, housing, building etc. In this application, the foam of the present invention is preferably used as a substitute for ALC (autoclaved light-weight concrete), calcium silicate plate, inorganic fiber plate or the like for which inorganic foams are previously used. The examples of the above include; heat insulating material of steel covering material, firebrick, internal wall panel for kitchen and cooking room, external wall panel having fire preventive property, combustion apparatus such as a boiler etc.; heat insulating material for a seat cushion material or an exhaust line of automobile etc.; interior panel of ship etc. or gap filler; and filler for fireproof safe.

② The application requiring the heat insulating property, for example, such as housing, building, train, aircraft, ship etc. In this application, the foam of the present invention is preferably used as a substitute for urethane foam, styrene foam or the like for which organic foams are previously used. The examples of the above include; gap filler for internal and external heat shielding board or panel of ceiling, wall, floor, roof etc. of housing or building etc., material for tatami mat, door etc.; adiabatic backing material of roof tile or roof material; inner lining material of roof of automobile or train, aircraft, ship etc; inner material around engine; a substitute for the part using honeycomb; insulating material of refrigerator, air conditioner, freezer, air conditioning equipment and air conditioning line; heat insulating covering material for tank of natural gas such as LNG or pipe line thereof; heat insulating material for a utility line in a plant; and a heat shielding packing material for transporting frozen commodities.

③ The application requiring the low density, for example, synthetic wood and its core material, light weight frame material, and packing material for package.

④ The application requiring a large surface area as the foam having continuous cells; for example, a substitute for a sand used in the sand drain method, a carrier of exhaust gas combustion catalyst, a carrier of deodorizer and flavoring agent.

⑤ The application requiring sound absorbent; for example, sound absorbent panel for house, material for sound proof inner wall inside of tunnel, sound insulating covering material for parapet, soundproof lining material of engine or other machines, or lining material for inside of housing.

⑥ The application requiring difficulty of biodegradation with the hardness that is not shown in the organic type or showing low environmental contamination as compared with the organic type; for example, a substitute for light weight banking, back filling material for tunnel, gardening block, frog for flower arrangement, a substitute for a gardening vermiculite.

Hereinafter, the invention will be explained with reference to Examples but is not limited to them alone. In the Production Examples, Examples and Comparative Examples, "part" denotes "part by weight" and "%" denotes "weight %".

Production Example 1

[Production of the Prepolymer (c)]

The following urethane prepolymers having NOC groups (c-1) to (c-3) were obtained by the method in which the necessary material components were prepared in a four neck flask and reacted for 5 hours at 90° C.

(c-1): A prepolymer obtained by reacting 420 parts by weight of polyoxyethylene polyoxypropylene glycol [molecular weight of 2188; a block copolymer comprising 20 wt. % of ethylene oxide and 80 wt. % of propylene oxide; "NEWPOL PE-62", the product of Sanyo Chemical Industries, Ltd.] with respect to 100 parts by weight of TDI ["CORONATE T-80," the product of NIPPON POLYURETHANE INDUSTRY CO., LTD.]. The prepolymer had an NCO content of 6.2 wt. %, a number average molecular weight of 1355, and was a resin solution being viscous at room temperature.

(c-2): A prepolymer obtained by reacting 150 parts by weight of polyoxyethylene polyoxypropylene triol [molecular weight of 3000; glycerin propylene oxide adduct to which ethylene oxide is added; "SANNIX GL-3000," the product of Sanyo Chemical Industries, Ltd.] with respect to 100 parts by weight of crude MDI ["Millionate MR-100," the product of NIPPON POLYURETHANE INDUSTRY CO., LTD.]. The prepolymer had an NCO content of 10.0 wt. %, a number average molecular weight of 1276, and was a resin solution being viscous at room temperature.

(c-3): A prepolymer obtained by reacting 133 parts by weight of ethylene butylene adipate [molecular weight of 1000; "SANESTOR No.22," the product of Sanyo Chemical Industries, Ltd.] and 26 parts by weight of polyethylene glycol [molecular weight of 400; "PEG 400," the product of Sanyo Chemical Industries, Ltd.] with respect to 100 parts by weight of MDI ["Lupranate MI," the product of BASF]. The prepolymer had the NCO content of 6.5 wt. %, the number average molecular weight of 1300, and was a resin solution being viscous at room temperature.

Production Example 2

[Production of the Foam in Examples 1 to 4 and Comparative Examples 1 to 2]

Phosphoric acids (a), the prepolymer (c) and tap water were uniformly stirred by the use of a homomixer, based on each composition of the following Table 1 of Examples 1 to 4 and Comparative Examples 1 to 2.

In Examples 1 and 2 and Comparative Example 1, the blowing agent (b) was further added in the obtained stirred mixture; on the other hand, in the Examples 3 and 4 and Comparative Example 2, the blowing agent (b) and inorganic filler (d) were further added into the obtained mixture, and each mixture is stirred and mixed. Then each mixture was poured into a mold (50×30×3 cm) and freely foamed, and thereby the molded foam of Examples 1 to 4 and Comparative Examples 1 and 2 were obtained.

TABLE 1

| Blending Component | Blending Content (part by weight) | | | | | |
|---|---|---|---|---|---|---|
| | Example | | | | Comparative Example | |
| | 1 | 2 | 3 | 4 | 1 | 2 |
| (a) a-1 | 521 | 552 | 271 | | | |
| a-2 | | | | 300 | | 400 |
| a-3 | 521 | 552 | 271 | 300 | | 400 |
| (b) b-1 | 625 | 662 | 217 | 240 | 320 | |
| (c) c-1 | 292 | 132 | | | 2500 | |
| c-2 | | | 614 | | | |
| c-3 | | | | 360 | | |
| Tap water | 1042 | 1104 | 542 | 600 | 250 | 800 |
| (d) d-1 | | | 1085 | 700 | 930 | |
| d-2 | | | | 400 | 530 | |
| d-3 | | | | 100 | 130 | |
| Flame retardant | | | | | 250 | |
| P(%) | 15.3 | 16.8 | 6.3 | 7.5 | 0 | 8.9 |
| (C) (%) | 14.9 | 7.0 | 25 | 15 | 83 | 0 |

Remarks
1) In table 1, the abbreviation marks respectively denote the following compounds:
(a) Phosphoric Acids
a-1: aluminum primary phosphate
a-2: phosphoric acid
a-3: magnesium primary phosphate
(b) Blowing Agent
b-1: basic magnesium carbonate
(c) the prepolymer
c-1, c-2, c-3: each prepolymer obtained by Production Example 1
(d) Inorganic Filler
d-1: aluminum hydroxide
d-2: alumina cement
d-3: Silas Balloon ["SANKILITE Yo.2," the product of SANKI INDUSTRY CO., LTD.]
2) In Comparative Example 1, phosphate ester containing halogen (the product name is "Unflame 70"), the product of Nippon Oil and Fats Co., Ltd. was used as a flame retardant by preliminarily adding it in the prepolymer (c) and by stirring uniformly.
3) (C) (%) in Table 1 denotes the content (wt. %) of the prepolymer (c) with respect to the whole entire solid parts at the time of the production of the foam. P (%) denotes a calculated value of the content (wt. %) of phosphoric atom in the obtained foam.

Test Example 1
[Evaluation of the Foam of Examples 1 to 4 and Comparative Examples to 1 to 2]

The foams of Examples 1 to 4 and Comparative Examples 1 to 2 obtained by Production Example 2 were let stand in a room having good ventilation for 1 month, followed by drying in a drier at 40° C. for 120 hours. Then the foam was left in a dessicator for 24 hours and tested by the following test methods.
[Test Method of the Foam Quality]
(1) Compressive Strength
JIS K-7220 (the method for compression test of a hard foamed plastic).
(2) Thermal Conductivity
JIS A-1412 (the measuring method for the thermal conductivity of the heat reserving board).

(3) Flexibility of the Foam
Being based on the flexibility test specified in JIS Z 1536 (buffer material for polystyrene foam packaging). The flexibility was evaluated by observing the state when the test piece was rolled along the circumference of a cylinder having a diameter of 40 mm.
(4) Non-combustibility, Semi-non-combustibility, and Fire Retardance (Hereinafter, the fire preventive property will be used as a general term.)

The fire preventive property was tested by the method respectively specified in Notification No. 1231 of Ministry of Construction of Japan (the method for testing semi-non-combustible material and fire retardant material) and Notification No. 1828 of Ministry of Construction of Japan (the method for testing non-combustible material).
[Results of Tests]

The results of the physical property tests of each foam and the observation of the outside appearance are shown in Table 2. Moreover, as to the specific contents and items of the results of the test of non-combustibility, semi-non-combustibility and fire retardancy in the item (4), the supplemental data (4-1) and (4-2) were specifically described as the typical example.

TABLE 2

| | Density | Thermal conductivity | Compression strength | Flexibility test (appearance of test piece) | Fire prevention property level | Feature of the outside appearance of the foam |
|---|---|---|---|---|---|---|
| Ex | | | | | | |
| 1 | 29 | 0.036 | 30 | No change in appearance | Semi-non-combustible | Soft, High flexibility and rebound resilience |
| 2 | 45 | 0.041 | 40 | No change in appearance | Semi-non-combustible | Soft, High flexibility and rebound resilience |
| 3 | 28 | 0.034 | 20 | Little bit breakage | Semi-non-combustible | Soft, Flexible and rebound resilience |
| 4 | 41 | 0.038 | 105 | Separated after broken | Non-combustible | Hard, Low flexibility and rebound resilience |
| C. EX | | | | | | |
| 1 | 28 | 0.034 | 40 | No change in appearance | Flame retardancy | Soft, High flexibility and rebound resilience |
| 2 | 80 | 0.050 | 20 | Separated after broken | Non-combustible | High brittleness |

*Ex = Example C. Ex = Comparative Example
Remarks) unit: Density: kg/m³, Thermal conducitivity: kcal/mhr° C., Compression strength: kPa.

[Supplemental Date of the Test Results of Fire Preventive Property (4-1)]

The detailed test results of the fire preventive property will be explained with reference to FIG. 1 and FIG. 2, each of which shows as typical Examples, a graph of surface test result of the foam (soft foam) of Example 1 and the foam (hard foam) of Example 4.

Figure 1:
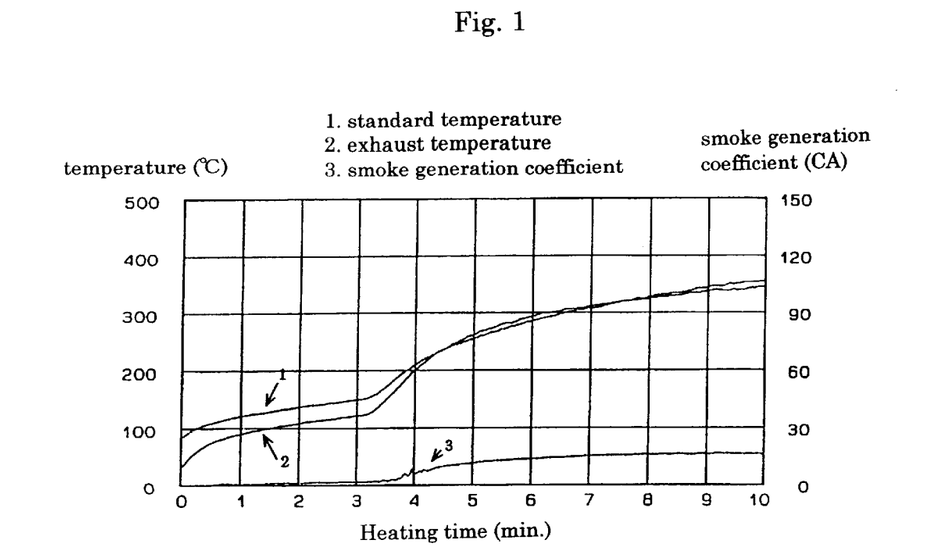
FIG. 1 is a graph showing the results of the test (surface test) of semi-non-combustible material of the foam of Example 1 of the present invention.

FIG. 1 is a graph showing the results of the surface test with respect to the foam of Example 1, which was conducted by the method specified in Notification No. 1231 of Ministry of Construction of Japan. In FIG. 1, the numeral 1 denotes a curve of the standard temperature, 2 denotes a curve of the exhaust temperature and 3 denotes a curve of the smoke generation coefficient. The size of the specimen is shown in Table 3.

Since the measurement date was obtained as the following table 3 from FIG. 1, the foam of Example 1 was judged to correspond to the semi-non-combustibile material.

TABLE 3

| Size of Specimen | 221 × 222 × 26.6 mm | |
|---|---|---|
| Measurement | Temperature time area (° C. · min) | 16.8 |
| Data | Smoke generation coefficient (CA) | 16.7 |
| | Time of lingering smoke (second) | 0 |

[Supplemental Date of the Test Results of Fire Preventive Property (4-2)]

Figure 2:
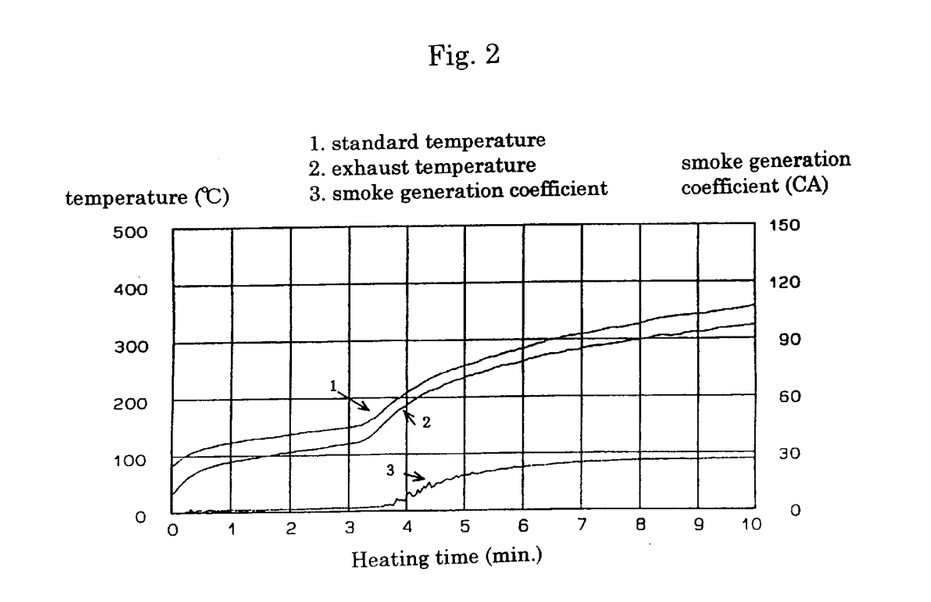
FIG. 2 is a graph showing the results of the test (surface test) of non-combustible material of the foam of Example 4 of the present invention.

FIG. 2 is a graph showing the results of the surface test with respect to the foam of Example 4, which was conducted by the method specified in Notification No. 1828 of Ministry of Construction of Japan. In FIG. 2, the numeral 1 denotes a curve of standard temperature, 2 denotes a curve of exhaust temperature and 3 denotes a curve of the smoke generation coefficient. The size of the specimen is shown in Table 4.

Since the measurement data were obtained as the following table 4 from FIG. 2, the foam of Example 4 was judged to correspond to the non-combustible material.

TABLE 4

| Size of Specimen | 220 × 223 × 26.4 mm | |
|---|---|---|
| Measurement | Temperature time area (° C. · min) | 0 |
| Data | Smoke generation coefficient (CA) | 26.9 |
| | Time of lingering smoke (second) | 0 |

[Further Note for the Test Results]
① In the foams of Examples 1 to 4 of the present invention, the foams of Examples 1 to 3 were soft foams having a rebound resilience and high flexibility; and the foam of Example 4 was a hard foam having low rebound resilience and low flexibility.
② Even if the surfaces of the foams of Examples 1 to 4 were subjected to the hand rubbing, powders were not generated. The demolded product also had such a sufficient strength property that it could be practically used as a large panel. Moreover, the level of the fire preventive property was also quite high, which corresponds to that of the non-combustible material to semi-non-combustible material.
③ As to Comparative Example 1, although a flame retardant was added, the level of the fire preventive property corresponded to that of the flame retardant material.
④ As to Comparative Example 2, although the level of the fire preventive property was high and the level corresponded to that of non-combustible material, the foam was quite brittle, surface peeling was found and breakage was generated in the molded product at the time of demolding. Consequently, it could be not said that the foam had such a sufficient strength that it could be used as a panel.

Figure 4:
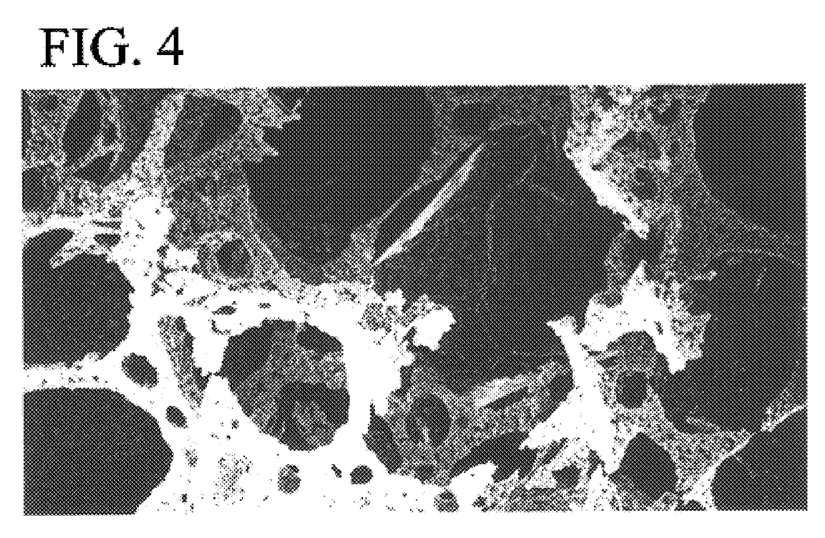
FIG. 4 is an electron micrograph of the foam of Example 1 of the present invention taken after the foam had burnt.

Test Example 2
[Structural Analysis of the Foam]
FIG. 3 is a 35 times magnified electron micrograph of the cross section of the foam of Example 1. FIG. 4 is a 35 times magnified electron micrograph of the foam of Example 1 taken after the foam was burnt. This FIG. 4 is a photo of the foam of Example 1 taken after it was left and burnt in the 400° C. electron furnace for 2 hours.

According to FIG. 4, the prepolymer (c-1) disappeared after burning, and inorganic foam structure comprising aluminum primary phosphate (a-1), magnesium primary phosphate (a-3) and basic magnesium carbonate (b-1) was found to be formed. In addition, when FIG. 3 and FIG. 4 were compared with each other, the film-like substance found in FIG. 3 disappeared in FIG. 4. As a result, the film made of the prepolymer (c-1) was observed to be formed in the foam.

As a result of the structural analysis of the foam (hard foam) of Example 4 instead of the foam (soft foam) of Example 1 in the same method as the above by the use of an electron micrograph before and after burning, the same analysis results could be obtained as in Example 1 except that the inorganic foam structure had the higher density and smaller cell pore structure.

The inorganic-organic composite foam of the present invention and the process for the production thereof exhibit the following effects.

(1) The inorganic-organic composite foam of the present invention radically improves the brittleness, the problem of the conventional foam of phosphoric acids; and
① in a case where the foam is made to be a foam having a high blowing ratio, although the foam is organic-inorganic composite foam, the foam exhibits such an excellent flexibility and a rebound resilience that it is taken as a soft urethane foam;
② the blowing rate of this foam can be adjusted to be from soft to hard; and
③ in both soft and hard foams, the brittleness is improved.
(2) If the foam has low specific gravity and high blowing ratio, it has such a sufficient strength that it does not have problems in practical use, so a panel having an excellent heat insulation property and light weight can be produced.
(3) Since the foam can be produced under room temperature and ordinary pressure, the specific reaction apparatus such as autoclaved curing etc. is not necessary.
(4) Foaming and curing can easily be conducted in the desired shaped mold. Moreover, troweling or spraying to walls and curing are also possible.
(5) The foam has the nearly same level of appearance and efficiency as the usual polyurethane foam and polystyrene foam, however, the level of the fire preventive property corresponds to that of the non-combustible material to semi-non-combustible material superior to the conventional organic based heat insulating material. The foam having safety in terms of disaster prevention can be provided to the market.

Industrial Applicability
Since the foam of the present invention exhibits the above mentioned effects, by utilizing the property having fire preventive property, heat insulation property, elasticity, flexibility, and strength, it is preferably used for the following applications.
① The application requiring the fire preventive property, for example, train, automobile, housing, building etc.

In this application, the foam of the present invention is used as a substitute for ALC (autoclaved light-weight concrete), calcium silicate plate, inorganic fiber plate or the like for which inorganic foams were previously used.

② The application requiring the heat insulating property, for example, housing, building, train, aircraft, ship etc. In this application, the foam of the present invention is used as a substitute for urethane foam, styrene foam or the like for which organic foams were previously used.

③ The application requiring low density.

④ The application requiring the foam having continuous cell pores and a large surface area.

⑤ The application requiring sound absorbency.

⑥ The application requiring the difficulty of biodegradation that is not shown in the organic type or low environmental contamination as compared with the organic type.

What is claimed is:

1. An inorganic-organic composite foam having an inorganic foam structure made from (a) a phosphorus-containing acid or a polyvalent metal salt thereof and (b) a blowing agent for (a), said inorganic structure having been improved with respect to brittleness through physically integrating (c) a urethane prepolymer that has NCO groups that are cured with water.

2. The foam according to claim 1, obtained by foaming and curing an aqueous mixture comprising (a), (b) and (c).

3. The foam according to claim 2, wherein the content of (c) in said aqueous mixture is in the range of 5 to 30 wt. % by the solid content.

4. The foam according to claim 1, wherein (a) is at least one compound selected from the group consisting of phosphoric acid, phosphoric anhydride, phosphorous acid, condensed phosphoric acid and polyvalent metal salts of these acids.

5. The foam according to claim 1, wherein said blowing agent (b) is a carbonate compound.

6. The foam according to claim 1, wherein the content of phosphorus atom is in the range of 3 to 20 wt. %.

7. The foam according to claim 1, further including an inorganic filler (d).

8. A process for producing an inorganic-organic composite foam which comprises the step of mixing (a) a phosphorus-containing acid or a polyvalent metal salt thereof, (b) a blowing agent for (a), (c) a urethane prepolymer having NCO groups, and water with or without (d) an inorganic filler to initiate a foaming and curing reaction of (a) with (b) and curing reaction of (c) with water; thereby obtaining an inorganic-organic composite foam having an inorganic foam structure made from (a) and (b), said structure having been improved with respect to brittleness through physically integrating (c) cured with water.

9. The process according to claim 8, wherein (a) is at least one compound selected from the group consisting of phosphoric acid, phosphoric anhydride, phosphorous acid, condensed phosphoric acid and polyvalent metal salts of these acids .

10. The process according to claim 8, wherein said blowing agent (b) is a carbonate compound.

11. The foam according to claim 1, having an inorganic foam structure in which (a) and (b) are reacted to foam.

12. The foam according to claim 1, having a specific gravity of not more than 0.1.

13. The foam according to claim 1, having the level of the fire preventive property corresponding to that of the non-combustible level or semi-non-combustible level as specified in Notification No. 1231 of Ministry of Construction of Japan.

14. An inorganic-organic composite foam having an inorganic foam structure made from (a) a phosphorus-containing acid or a polyvalent metal salt thereof and (b) a blowing agent for (a), said inorganic structure having been improved with respect to brittleness through physically integrating (c) a urethane prepolymer having NCO groups cured with water, wherein said blowing agent (b) is at least one selected from the group consisting of a carbonate compound (b1) and a lightweight metal (b2) capable of generating gas upon reaction with an acid or an alkali.

15. The foam according to claim 14, wherein said blowing agent is the carbonate compound (b1) and is at least one compound selected from the group consisting of sodium carbonate, sodium hydrogen carbonate, potassium carbonate, ammonium carbonate, calcium carbonate, barium carbonate, basic magnesium carbonate and basic zinc carbonate.

16. The foam according to claim 14, wherein said blowing agent is the light metal (b2) and is at least one metal selected from the group consisting of magnesium, aluminum and zinc.

17. The foam according to claim 1, wherein the amount of said blowing agent (b) is in the range of 0.1 to 100 parts by weight with respect to 100 parts by weight of phosphorus-containing acid (a).

18. The foam according to claim 7, wherein said inorganic filler (d) is at least one selected from the group consisting of cement, clay mineral, inorganic light weight aggregate, inorganic fiber and other water insoluble inorganic powder material.

19. The foam according to claim 1, wherein the content of NCO group in said urethane prepolymer (c) is in the range of 0.5 to 30 weight %.

20. The process according to claim 8, wherein said blowing agent (b) is at least one selected from the group consisting of a carbonate compound (b1) and a light weight metal (b2) capable of generating gas upon reaction with an acid or an alkali.

* * * * *